(12) United States Patent
Frey

(10) Patent No.: US 9,371,887 B2
(45) Date of Patent: Jun. 21, 2016

(54) SPLICING DEVICE FOR CLOSING A LOOPED MATERIAL BAND AND MATERIAL BAND PROVIDED WITH SUCH SPLICING DEVICE

(71) Applicant: TANALS S.A.S., Masevaux (FR)

(72) Inventor: Pierre-Régis Frey, Lutterbach (FR)

(73) Assignee: Tanals S.A.S., Masevaux (FR)

( * ) Notice: Subject to any disclaimer, the term of this patent is extended or adjusted under 35 U.S.C. 154(b) by 0 days.

(21) Appl. No.: 14/722,667

(22) Filed: May 27, 2015

(65) Prior Publication Data

US 2015/0345588 A1  Dec. 3, 2015

(30) Foreign Application Priority Data

May 30, 2014  (FR) ...................... 14 54900

(51) Int. Cl.
*F16G 3/02* (2006.01)
*B65G 15/36* (2006.01)
(Continued)

(52) U.S. Cl.
CPC  *F16G 3/02* (2013.01); *B65G 15/36* (2013.01); *F16G 1/28* (2013.01); *F16G 3/10* (2013.01); *B29C 65/564* (2013.01); *B29C 66/1142* (2013.01); *B29C 66/223* (2013.01); *B29C 66/225* (2013.01); *B29C 66/4324* (2013.01);
(Continued)

(58) Field of Classification Search
CPC ........ B65G 15/32; B65G 15/34; B65G 15/36; F16G 3/02; F16G 3/10; F16G 1/08; F16G 1/12; F16G 1/16; F16G 1/28; Y10T 24/1688; B29C 65/564; B29C 66/225; B29C 66/1142; B29C 66/223; B29C 66/73921; B29C 66/72141; B29C 66/4324; B29L 2031/7094; B29L 2031/709; B29L 2031/7092
See application file for complete search history.

(56) References Cited

U.S. PATENT DOCUMENTS 3,212,627 A  *  10/1965  Beebee .................. B29D 29/00
                                                                198/847
3,988,940 A  *  11/1976  Szonn ....................... F16G 3/10
                                                                474/254
(Continued)

FOREIGN PATENT DOCUMENTS

DE          444 469         5/1927
GB       2 290 515 A        1/1996
WO     2012/155281 A1      11/2012

OTHER PUBLICATIONS

Search Report Corresponding to FR 14/54900 mailed Feb. 25, 2015.

*Primary Examiner* — Gene Crawford
*Assistant Examiner* — Keith R Campbell
(74) *Attorney, Agent, or Firm* — Davis & Bujold PLLC; Michael J. Bujold

(57) ABSTRACT

A splicing device (10) for closing a looped material band (1) comprising two splicing elements (20, 30) intimately linked to the ends (2, 3) of the material band (1), assembled together by fitting two toothings (22, 23) into each other, and locked by a transverse locking rod (15) inserted in the aligned transverse openings (14) of the teeth (13) of each toothing. The splicing elements (20, 30) are made out of a material compatible with that of the material band and comprise a traction core extending longitudinally up to the teeth (13) and surrounding the transverse opening (14) of teeth (13) of each toothing (22, 32) so that, when the splicing device (10) is assembled and locked, the traction cores of the splicing elements ensure the tensile strength of the splicing device (10) while remaining very flexible.

17 Claims, 3 Drawing Sheets

(51) Int. Cl.
*F16G 1/28* (2006.01)
*F16G 3/10* (2006.01)
*B29L 31/00* (2006.01)
*B29C 65/56* (2006.01)
*B29C 65/00* (2006.01)

(52) U.S. Cl.
CPC ..... *B29C66/72141* (2013.01); *B29C 66/73921* (2013.01); *B29L 2031/709* (2013.01); *B29L 2031/7092* (2013.01); *B29L 2031/7094* (2013.01); *Y10T 24/1688* (2015.01)

(56) References Cited

U.S. PATENT DOCUMENTS

| 6,695,134 | B2 * | 2/2004 | Rubino | F16G 3/04 198/844.2 |
| 7,594,574 | B2 * | 9/2009 | Mol | B29C 65/564 198/844.2 |
| 2014/0106918 | A1 | 4/2014 | Richter et al. | |

* cited by examiner

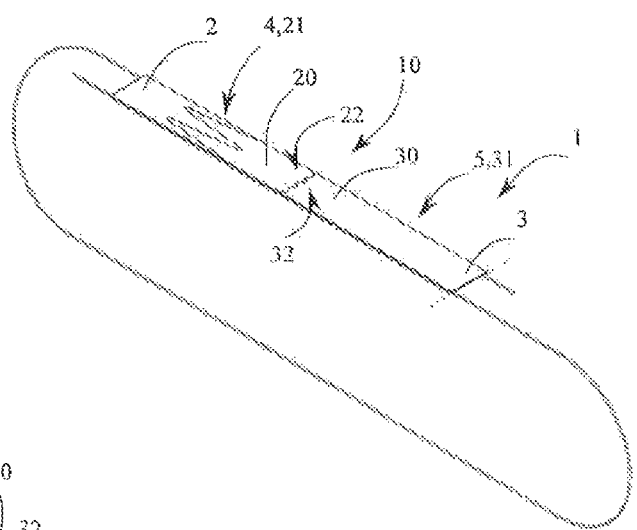
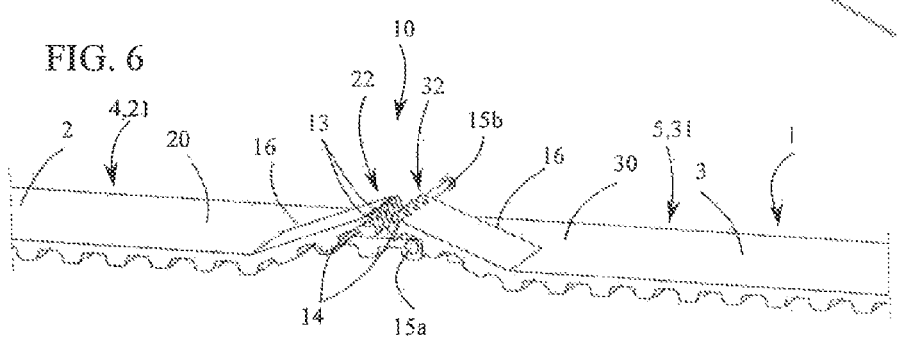

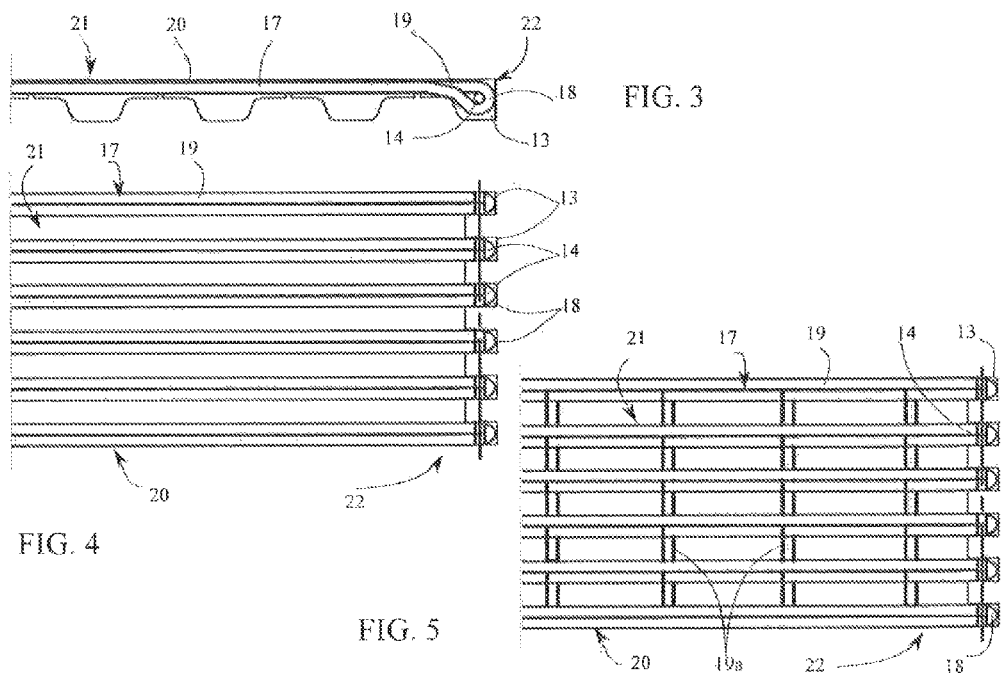

SPLICING DEVICE FOR CLOSING A LOOPED MATERIAL BAND AND MATERIAL BAND PROVIDED WITH SUCH SPLICING DEVICE

TECHNICAL SCOPE

The present invention relates to a splicing device for closing a looped material band such as in particular a conveyor belt, a power transmission belt or similar, whereby this splicing device comprises two splicing elements provided at one end with an assembly area arranged to be intimately linked respectively to the two longitudinal ends of the material hand, and with a toothing at the other end, the toothings being provided respectively in the plane of the splicing elements and having complementary shapes to fit into each other, the teeth of each toothing comprising at least one transverse opening aligned with that of the neighboring teeth, in order to define, when the toothings are fitted into each other, at least one transverse passage arranged to receive at least one locking rod.

The invention also relates to a material band such as in particular a conveyor belt, a power transmission belt or similar, this material band being looped by a splicing device as described above.

Such a splicing device is in particular disclosed in publication WO 2012/155281 A1 referring to a timing belt. The timing belt, also called toothed or synchronous belt, made out of a known material, is used to ensure slip-free transmission the same way as chains or gears, with the advantage that it does not generate noise disturbances. With this type of belt, it is consequently imperative that the pitch of the teeth remains fixed and invariable in time. This type of belt can be produced by extrusion in a closed loop or in the form of a continuous material band that has to be cut and assembled either by a definitive splice or by a dismountable splice. In the case of a splice, the latter shall not affect the pitch of the teeth, or the flexibility of the belt, which still must go on wrapping perfectly around the pulleys it meshes, without play nor slipping. This splice shell therefore not lengthen, nor show bending stiffness when passing on the pulleys. The splicing device described in the above-mentioned publication is made of two spring steel plates that, even though they are positioned in the neutral bending plane of the belt, cause in the splicing area of the belt a bending stiffness that is incompatible with the function of the belt and strongly affects the lifetime of the belt. Moreover, steel is not compatible with the thermoplastic material of the belt and this is why the splicing elements include recesses to allow the connection with the thermoplastic material by inching. The splicing elements out of steel however have the advantage of adding tensile strength to the splice, as they are assembled together by fitting into each other two very short toothings coupled by one single transverse locking rod forming a joint. Nevertheless, this splicing device must be manufactured for every belt width, which requires managing a large number of references, it is indeed not possible to produce this splicing device in only one size that would then be cut to the width and length suitable for the belt, to equip. Moreover, due to its specificity, the assembly of the splicing device at the ends of the belt cannot be entrusted to the dealer or to the end customer. Therefore this solution is not satisfying.

Publication GB 2 290 515 A deals with splices for open conveyors made of two distant and parallel belts connected together by means of parallel transverse rods, which have no relation with timing belts. However, certain described splices provide that the reinforcing cables of the belts form a loop around the transverse openings provided in the assembly area of the belts. This embodiment imposes an individualized production of every conveyor defined by a width and a length, which is not profitable from the economic point of view. Other similar splices are also described in publications U.S. Pat. No. 3,212,627 A and DE 444 469 C for non-toothed conveyors. In addition to the previously mentioned economic disadvantage, this manufacturing method inevitably introduces an excess thickness in the assembly area, due to the closed loop formed by the reinforcing cables around the transverse openings, but also to the overlapping of reinforcing cables added in this area. This kind of splice is consequently not suitable for timing belts, as any excess thickness would alter the winding pitch and prevent the belt from meshing in the pulleys. These solutions are not satisfying.

DESCRIPTION OF THE INVENTION

The present invention aims to remedy these disadvantages by offering a splicing device, separated from the material band, made in a material compatible with that of the material band, having a yield strength similar to that of the material band, while offering high tensile resistance, respecting the thickness of the material hand and remaining very flexible, which ensures it a very high fatigue strength, this device being moreover easy to manufacture, cost-effective, reversible and easy to use for the manufacturer, the dealer and even the customer, to equip any belt, toothed or not, reinforced or not, and easy to adapt in width and/or in length to the dimensions of the belt to equip.

To that purpose, the invention relates to a splicing device of the kind defined in the preamble, characterized in that the splicing elements are made out of a thermoplastic material compatible with the material of said band and comprise each at least one traction core embedded in said thermoplastic material, said traction core extending longitudinally in said splicing elements up to the teeth of each toothing and said traction core surrounding at least partly the transverse opening of the teeth of each toothing so that, when said splicing device is assembled by means of said locking rod, the traction cores of the two splicing elements increase the tensile strength of said splicing device.

According to the embodiment variants of the invention, each splicing element comprises a traction core arranged in longitudinal turns between its assembly area and its toothing, or a plurality of traction cores arranged in longitudinal loops between its assembly area and its toothing. In all cases, the strands of the longitudinal turns or loops formed by said traction core are arranged in a same longitudinal plane identical to the neutral fiber of said splicing device.

According to the embodiment variants, the longitudinal turns or loops can be connected with each other by a transverse shoot to form a mesh with them.

In the case of a material band having a toothed side, the splicing elements advantageously comprise a toothed side in order to ensure the continuity and the pitch of the notches of said material band.

The toothings of the splicing elements can comprise parallelepipedic teeth, and the teeth of the toothings can comprise one single transverse opening arranged to define a joint axis when the splicing device is assembled.

The splicing elements can also comprise at least one longitudinal slot that separates their toothing in at least two parts arranged to receive at least two locking rods arranged head to tail in the transverse passage defined by the transverse openings.

The assembly area of every splicing element can comprise at least one finger and one recess, both having elongated and complementary shapes.

Also to that purpose, the invention relates to a material band of the kind defined in the preamble, characterized in that it comprises a splicing device as described above.

BRIEF DESCRIPTION OF THE DRAWINGS

The present invention and its advantages will be better revealed in the following description of embodiments given as non limiting examples, in reference to the drawings in appendix, in which:

FIG. 2 is a partial view of a material band closed in a loop by the splicing device of FIG. 1, FIG. 3 is a longitudinal sectional view of one of the elements of the splicing device.

FIG. 4 is a sectional top view of the splicing element of FIG. 3 according to a first embodiment, FIG. 5 is a view similar to that of FIG. 4, according to a second embodiment, and FIG. 6 is a perspective view of the splicing device according to an embodiment variant of the invention assembled by two locking rods arranged head to tail.

ILLUSTRATIONS OF THE INVENTION AND VARIOUS WAYS OF REALIZING IT

Figure 1:
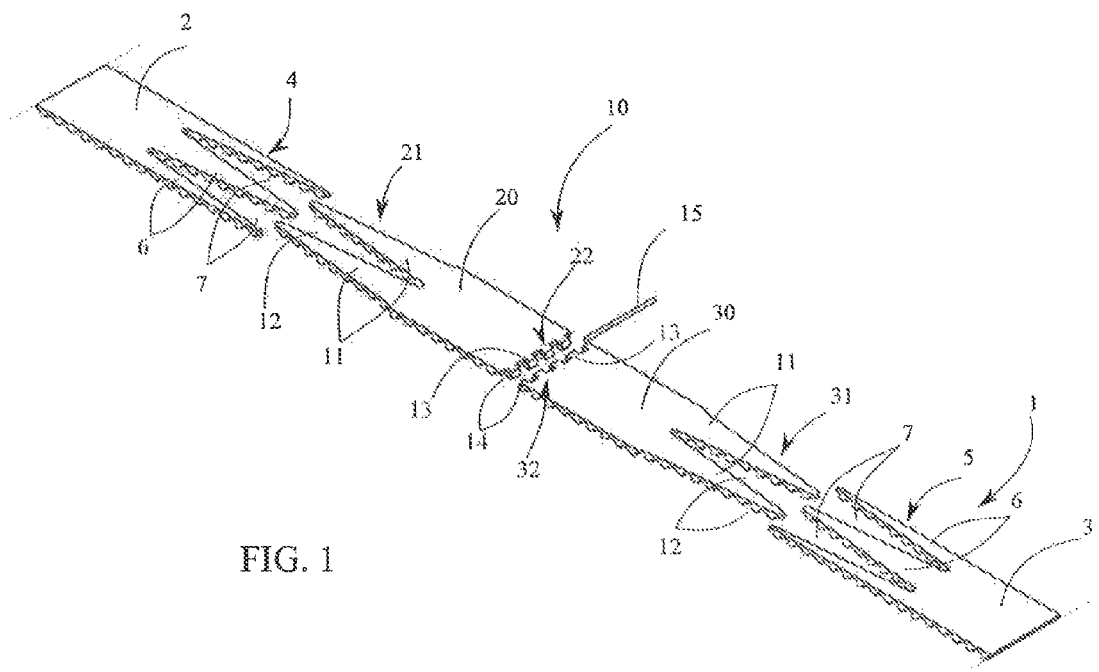
FIG. 1 is an exploded view of a splicing device according to the invention arranged between two longitudinal ends of a material band.

With reference to the figures, the splicing device 10 according to the invention allows closing a material band 1 in a loop, such as in particular a conveyor belt, a power transmission belt or similar. The example illustrated in the figures shows a timing power transmission belt, but this example is not restrictive, as the invention applies to any other type of material band, provided or not with a toothed side, provided or not with a reinforcing core or similar. In the case of a belt having a toothed side, the splicing device 10 will comprise the same toothed side in order to ensure the continuity and the pitch of the notches of material band 1. The length of the pitch, the width of the notches, the profile of the notches, etc., are data defined by standards, according to the pulleys meshing with this type of belts.

The splicing device 10 comprises in particular two splicing elements 20, 30 that are distinct, separated and assembled respectively to the longitudinal ends 2, 3 of material band 1 by means of an intimate assembly achieved preferably by thermowelding or similar. To that purpose, the splicing elements 20, 30 of splicing device 10 are made of a material compatible with the material of material band 1 to ensure an intimate and durable chemical bond. These materials are mostly thermoplastic materials and, as a non-restrictive example, polyurethanes. Moreover, the splicing elements 20, 30 are arranged to prolongate material band 1 without it being possible to distinguish them and without creating additional thickness. This is why they have a same thickness, a same width, a same toothed profile, etc., as those of material band 1. On the other hand, the ends 2, 3 of material band 1 and the corresponding ends 21, 31 of splicing elements 20, 30 comprise assembly areas 4, 5, 21, 31 that extend respectively in the plane of material band 1 and of splicing elements 20, 30. These assembly areas 4, 5, 21, 31 can have a rectilinear geometric shape, but they have preferably more complex geometric shapes that allow mechanical fitting. In the figures, these assembly areas 4, 5, 21, 31 comprise an alternation of elongated fingers 6, 11 and recesses 7, 12 with a triangular shape and rounded angles that are symmetrical and complementary, so as to be able to fit into each other before being merged. Of course, any other complementary fitting shape can be suitable. The main interest of these assembly areas 4, 5, 21, 31 lies in the increase of the contact surfaces and in their distribution on an assembly length large enough to improve both the chemical bond and the mechanical link between splicing elements 20, 30 and material band 1. FIG. 2 illustrates partly material band 1 looped by splicing device 10 and shows on the one hand the assembly areas 4, 21, visible prior to the melting, on the left side of splicing device 10, and on the other hand the assembly areas 5, 31, invisible after melting, on the right side of splicing device 10. So, splicing device 10 is designed to merge with material band 1 after assembly and become an integral part of the belt.

Splicing elements 20, 30 of splicing device 10 comprise, at their free end, a toothing 22, 32. Toothings 22, 32 extend in the plane of said splicing elements 20, 30 and have a complementary geometric shape so as to fit into each other. In the illustrated example, teeth 13 of every tooting 22, 32 comprise a transverse opening 14 aligned with that of the neighboring teeth 13 in order to define, when toothings 22, 32 are fitted into each other, a transverse passage arranged to receive at least one locking rod 15. So, transverse openings 14 and locking rod 15 form a joint axis that makes splicing device 10 flexible. Of course, this example is not restrictive and, depending on the specification sheet of the belt to be manufactured, it is possible to provide several parallel transverse openings 14 to receive several parallel locking rods 15. In the illustrated example, teeth 13 of toothings 22, 32 are shallow and have a square shape to fit into the longitudinal axis of material band 1. These teeth 13 are identical and symmetrical, but they can be different and asymmetrical. Likewise, they can have other complementary geometric shapes, such as for example a dovetail shape, which impose assembling in an axis perpendicular to the longitudinal axis of material band 1 and are less convenient, but offer an additional mechanical locking. The transverse openings 14 arranged in each of teeth 13 can be smooth or structured, bare or provided with an insert, for example in the form of a sleeve having a mechanical reinforcement function. Any other embodiment of these transverse openings 14, in particular in function of the locking rods 15 used, can be contemplated.

The locking rods 15 have a length that extends on the whole width of splicing device 10. They can be smooth, threaded, self-tapping, with or without head, crimped or not, associated with a nut and a lock nut or not, in two interlocking parts, etc. In the variant illustrated in FIG. 6, the single locking rod 15 is replaced with two locking rods 15a, 15b that extend on half the width of splicing device 10, each comprising a flat head and arranged head to tail in the same transverse passage formed by transverse openings 14 in order to interlock transversely. In this variant, splicing elements 20, 30 comprise a longitudinal slot 16 that separates each toothing 22, 32 in two equal parts. This slot 16 allows, when assembling splicing elements 20, 30, to access to a first half of toothings 22, 32 through the center of splicing device 10 in order to insert a first locking rod 15a into it, then to access the second half of toothings 22, 32 through the center of splicing device 10 in order to insert a second locking rod 15b into it. This assembly method can be particularly advantageous for large widths of material band 1. Of course, longitudinal slot 16 can be shifted with respect to the center of splicing device 10. In this case, one will choose locking rods 15a, 15b with suitable lengths.

The number of longitudinal slots 16 is not necessarily limited to one. In this case, one will adapt the number and length of the locking rods.

The splicing device 10 according to the invention is remarkable as it is designed to ensure excellent tensile strength to the looped material band 1 provided with it. To achieve this goal, the splicing elements 20, 30 comprise each at least one traction core 17 embedded in the thermoplastic material and extending longitudinally up to the teeth 13 of every toothing 22, 32, as represented in FIGS. 3, 4 and 5, to surround at least partly transverse opening 14 of every tooth 13 by forming an open or closed loop 18. In the illustrated example, each splicing element 20, 30 comprises a single traction core 17, arranged in its thickness, preferably in the center corresponding to the neutral fiber of the belt, right above the toothed side, in longitudinal turns 19 between its assembly area 21, 31 and its toothing 22, 32, forming loops 18 around said transverse openings 14 arranged in teeth 13. It is of course also possible to provide a number of traction cores 17 identical or not to the number of teeth 13, each traction core 17 being arranged in a longitudinal loop 19 between its assembly area 21, 31 and its toothing 22, 32 and around said transverse openings 14 arranged in teeth 13. The strands of the longitudinal turns or loops 19 are preferably arranged side by side, without overlapping. It is made clear that every tooth 13 can comprise at least one loop 18 formed by traction core 17, but can also comprise two loops 18 per tooth 13, or more, according to the width of said teeth 13. Conversely, it is also possible to provide a loop 18 in a tooth 13 out of two or out of three, according to the tensile strength to achieve.

By "traction core 17", one means one or several wires or cables, individual or assembled in a strand or in a ply, twisted, braided or woven, out of textile and/or metallic materials. FIG. 5 shows to that purpose a traction core 17 wherein the longitudinal turns or loops 19 are assembled together by a transverse shoot 19*a* forming a mesh with them. This embodiment variant has the advantage of facilitating the handling of traction core 17 when manufacturing splicing device 10 as explained later. This traction core 17 must adhere to the thermoplastic material of splicing elements 20, 30 and show excellent tensile strength, high flexibility, minimum or even zero lengthening, good bending strength. Continuous synthetic filaments will be preferred to metal wires, without this example being restrictive.

So, when material band 1 is looped by assembling and locking splicing elements 20, 30 of its splicing device 10 by means of locking rod 15, loops 18 formed by traction core 17 around transverse openings 14 inside of teeth 13 of each toothing 22, 32 cross each other transversally and are also locked by locking rod 15. The result of this original construction is the creation of a mechanically very strong splice, in particular relating to tensile strength in the longitudinal axis of material band 1, while remaining very flexible to ensure good fatigue strength.

Possibilities for Industrial Application:

The splicing device 10 according to the invention can be manufactured according to a simple molding process in a mold that corresponds for example to the format and profile of the material band 1 this device is intended for. Two molds can be used, one for every splicing element 20, 30, as toothings 22, 32 must be complementary. It is also possible to use one same mold with removable inserts that are specific for every splicing element 20, 30. It is advantageously possible to use one single mold to manufacture standard and identical splicing elements 20, 30 that will then be cut in width and/or length to the dimensions of material band 1 to equip.

One places in the mold a first transverse pin in the area intended for forming toothing 22, 32 so as to create transverse openings 14 and a second transverse pin in the opposite area intended for forming later assembly area 21, 31. One places traction core 17 in the mold, starting from a longitudinal edge of the mold and making longitudinal turns 19 from one transverse pin to the other transverse pin, up to reach the other longitudinal edge of the mold. Loops 18 are thus formed in particular around the first transverse pin that delimits the transverse openings 14 arranged in teeth 13 of each toothing 22, 32. It is possible to provide one loop 18 per tooth 13 on the whole length of the toothing 22, 32. It is also possible to provide two loops 18 per tooth 13 on the whole length of the toothing 22, 32. It is also possible to provide one loop 18 on two teeth 13 or any other arrangement. Traction core 17 thus forms a traction ply inside of the mold, wherein all strands of longitudinal turns 19 are located in a same longitudinal plane, this longitudinal plane being preferably identical to the neutral fiber of material band 1. Of course, the longitudinal turns 19 formed from one transverse pin to the other can be simple turns without crossing or complex turns with at least one central crossing in the thickness of the mold. It is also possible to install several traction cores 17. In this case, every traction core 17 can be placed in the mold in a longitudinal closed loop around the two transverse pins. Here too, it is possible to provide a number of traction cores 17 identical to the number of teeth 13, so that every tooth 13 is reinforced with a loop 18, or any other arrangement compatible with the specification sheet. In all cases, the longitudinal turns or loops 19 can be substantially parallel to each other or crossed in the longitudinal plane of the mold. When traction core 17 is made of a mesh as the example illustrated in FIG. 5, one first places the mesh in the mold and one then positions the transverse pins in the loops of the already formed turns. After having positioned traction core 17, one casts the thermoplastic material in the mold to form one of splicing elements 20, 30. The filled mold can be placed in a hot press if necessary. Prior to the ejection of the produced splicing element 20, 30, the two transverse pins are removed. Once the two splicing elements 20, 30 are manufactured, they can be assembled by their toothing 22, 32 using the locking rod(s) 15, 15*a*, 15*b* for storage, transportation, etc. This splicing device 10 can be manufactured in the width of the material bands 1 to equip. To simplify storage management, it can be manufactured in a standard width and cut to the width of the material band 1 to equip, or assembled side by side with other identical splicing devices 10 to cover large material band 1 widths.

The splicing device 10 thus manufactured can be assembled with material band 1 either in the manufacturer's premises, or in a dealer's premises, or in the customer's premises, as it can be adjusted to size simply by cutting and it can be merged with the ends of material band 1 according to a classical method.

To equip a material band 1 with such splicing device 10, one forms the assembly areas 4, 5, 21, 31 respectively in the longitudinal ends 2, 3 of material band 1 and in the splicing elements 20, 30 of the adapted splicing device 10. One creates, in particular by stamping, water jet cutting or any other suitable technique, fingers 6, 11 and recesses 7, 12 of assembly areas 4, 5, 21, 31. In this case, traction core 17 integrated in splicing elements 32, 30 is cut, without affecting the mechanical properties of splicing device 10. This is why one obtains, in splicing elements 20, 30, open longitudinal turns or loops, as the section of the turns or loops opposed to toothing 22, 32 has been cut when creating assembly areas 21, 31. These assembly areas 4, 5, 21, 31 are intimately linked in a corresponding die in a hot press, to assemble definitively splicing elements 20, 30 and ends 2, 3 of material band 1. This material band 1 provided with its splicing device 10 can then be mounted on any kind of machine. It can easily be mounted and removed thanks to the presence of splicing device 10, facilitating greatly maintenance operations on the machines.

This description shows clearly that the invention allows reaching the goals defined, that is to say a splicing device 10 that is reversible, cost-effective, easy to implement, chemically compatible with the material band 1 to equip, while ensuring optimal tensile strength, that is even comparable with that of a closed material loop without splice, and particularly suitable for timing belts, as splicing device 10 does not generate any feature modification.

The present invention is not restricted to the examples of embodiment described, but extends to any modification and variant which is obvious to a person skilled in the art.

The invention claimed is:

1. A splicing device (10) for closing a looped material band (1), the material band (1) having two longitudinal ends (2, 3) and the splicing device comprising:
    two splicing elements (20, 30), and, fit end of an assembly area (21, 31) of each of the two slicing elements (20, 30) being arranged to be intimately linked respectively to one of the two longitudinal ends (2, 3) of the material band (1),
    a toothing (22, 23) being supported at a second end of each of the two slicing elements (20, 30),
    each toothing (22, 23) being provided respectively in a plane of the two splicing elements (20, 30) and having a complementary shape to fit into each other,
    teeth (13) of each toothing (22, 32) comprising at least one transverse opening (14) aligned with that of neighboring teeth (13) in order to define, when toothings (22, 32) are fitted with each other, at least one transverse passage arranged to receive at least one locking rod (15, 15a, 15b),
    wherein the two splicing elements (20, 30) are made out of a thermoplastic material which is compatible with the material band (1) and each comprises at least one traction core (17) embedded in the thermoplastic material,
    the traction core (17) extends longitudinally in the splicing elements (20, 30) up to the teeth (13) of each toothing (22, 32),
    the traction core (17) at least partially surrounds the transverse opening (14) of the teeth (13) of each toothing (22, 32) so that, when the splicing device (10) is assembled by the locking rod (15, 15a, 15b), the traction cores (17) of the two splicing elements (20, 30) increase a tensile strength of the splicing device (10),
    each splicing element (20, 30) comprises at least one traction core (17) extending between the assembly area (21, 31) and the toothing (22, 32) and forming a longitudinal turn or loop (19) at the toothing (22, 32), and
    strands of each longitudinal turn or loop (19) are arranged side by side with one another, without the overlapping one another, and lying within the plane of the two splicing elements (20, 30).

2. The splicing device according to claim 1, wherein each splicing element (20, 30) comprises a plurality of traction cores respectively arranged in longitudinal loops between the assembly area (21, 31) and the toothing (22, 32).

3. The splicing device according to claim 1, wherein the strands of the longitudinal turns or loops, formed by the traction core, are arranged in a same longitudinal plane identical to a neutral fiber of the splicing device.

4. The splicing device according to claim 1, wherein the material band (1) has a toothed side and the splicing elements (20, 30) comprise a toothed side in order to ensure a continuity and a pitch of notches of the material band (1).

5. The splicing device according to claim 1, wherein the toothings (22, 32) of the splicing elements (20, 30) comprise parallelepipedic teeth (13).

6. The splicing device according to claim 1, wherein the teeth (13) of the toothings (22, 32) comprise one single transverse opening (14) arranged to define a joint axis when the splicing device (10) is assembled.

7. The splicing device according to claim 1, wherein the splicing elements (20, 30) comprise at least one longitudinal slot (16) that separates their toothing (22, 32) in at least two parts arranged to receive at least two locking rods (15a, 15b) arranged head to tail in the transverse passage defined by the transverse openings (14).

8. The splicing device according to claim 1, wherein the assembly area (21, 31) of each splicing element (20, 30) comprise at least one finger (11) and one recess (12), both having elongated and complementary shapes.

9. The splicing device according to claim 1, wherein the splicing device (10), for closing a looped material band (1), is one of a conveyor belt or a power transmission belt.

10. The splicing device according to claim 1, characterized in that the longitudinal turns or loops (19) are connected with each other by a transverse shoot (19a) to form a mesh thereof.

11. A material band (1) whereby this material band is looped, the material band (1) comprising:
    at least one splicing device (10) for facilitating looping of the material band (1) via two splicing elements (20, 30),
    at a first end of each of the two splicing elements (20, 30) facilitates intimately assembly, via an assembly area (21, 31), with a respective end of two longitudinal ends (2, 3) of the material band (1) and while as second end of each of the two splicing elements (20, 30) facilitates assembly together by two toothings (22, 23),
    each of the two toothings (22, 23) having a complementary shape and being provided respectively in a plane of the splicing elements (20, 30),
    teeth (13) of each of the two toothings (22, 32) comprising at least one transverse opening (14) aligned with that of neighboring teeth (13), in order to define, when toothings (22, 32) are fitted into each other, at least one transverse passage arranged for receiving at least one locking rod (15, 15a, 15b),
    wherein
    the splicing elements (20, 30) are made out of a thermoplastic material compatible with a material of the material band (1) and comprise at least one traction core (17) embedded in the thermoplastic material,
    the traction core (17) extends longitudinally in the splicing elements (20, 30) up to the teeth (13) of each toothing (22, 32),
    the traction core (17) at least partially surrounds the transverse opening (14) of teeth (13) of each toothing (22, 32) so that, when the splicing device (10) is assembled by at least one locking rod (15, 15a, 15b), the traction cores (17) increase a tensile strength of the splicing device (10),
    each splicing element (20, 30) comprises at least one traction core (17) extending between the assembly area (21, 31) and the toothing (22, 23) and forming a longitudinal turn or loop (19) at the toothing (22, 32), and
    strands of each longitudinal turn or loop (19) are arranged side by side with one another, without the overlapping one another, and lying within the plane of the two splicing elements (20, 30).

12. The material band according to claim 11, the material band (1) has a toothed side, wherein the material band (1) has a toothed side and the splicing elements (20, 30) comprise a toothed side in order to ensure the continuity and the pitch of the notches of the material band (1).

13. The material band according to claim 11, wherein the toothings (22, 32) of the splicing elements (20, 30) comprise parallelepipedic teeth (13).

14. The material band according to claim 11, wherein the teeth (13) of the toothings (22, 32) comprise one single transverse opening (14) arranged to define a joint axis when the splicing device (10) is assembled.

15. The material band according to claim 11, wherein the splicing elements (20, 30) comprise at least one longitudinal slot (16) that separates their toothing (22, 32) in at least two parts arranged to receive at least two locking rods (15a, 15b) arranged head to tail in the transverse passage defined by the transverse openings (14).

16. The material band according to claim 11, wherein the assembly areas (4, 5; 21, 31) belonging respectively to the longitudinal ends (2, 3) of the material band (1) and to the splicing elements (20, 30) comprise at least one finger (6, 11) and one recess (7, 12), both being elongated and having complementary shapes, so that matching assembly areas (4, 5; 21, 31) are fitted into each other for being merged.

17. The material band according to claim 11, wherein the material band (1) is one of a conveyor belt or a power transmission belt.

\* \* \* \* \*